United States Patent [19]
Pastan

[11] 3,719,078
[45] March 6, 1973

[54] LINEAR OUTPUT BOAT SPEEDOMETER

[75] Inventor: Harvey L. Pastan, Chestnut Hill, Mass.

[73] Assignee: The Eastern Company, Naugatuck, Conn.

[22] Filed: Aug. 16, 1971

[21] Appl. No.: 172,131

[52] U.S. Cl. ................................................73/181
[51] Int. Cl. ........................................G01c 21/12
[58] Field of Search............73/186, 181, 189, 432 A

[56] References Cited

UNITED STATES PATENTS 3,354,714   11/1967   Condon et al. ..........................73/186

*Primary Examiner*—Donald O. Woodiel
*Attorney*—Carl Hoppe et al.

[57] ABSTRACT

A boat speedometer including an electronic circuit combined with a force velocity measuring transducer which has a non-linear output to convert the output to a voltage which is directly proportional to speed. In the described embodiment, the transducer output signal is approximately 5 volts at zero speed and varies as the 1.9th power of speed up to a maximum signal level of 7.5 to 8 volts and this is converted to a voltage directly proportional to speed.

2 Claims, 2 Drawing Figures

INVENTOR.
HARVEY L. PASTAN

INVENTOR.
HARVEY L. PASTAN

LINEAR OUTPUT BOAT SPEEDOMETER

SUMMARY OF THE INVENTION

The present invention relates to a boat speedometer wherein a transducer on the boat is operated by a probe which moves through the water and the drag on the probe produces a voltage which is an exponential function of velocity. In a practical embodiment of the invention, the transducer output signal was found to be the 1.9th power of speed between the minimum output signal of approximately 5 volts at zero speed and the maximum signal level of 7.5 to 8 volts. If such a signal were used directly to operate an analog instrument such as a volt meter calibrated as a speedometer, it is obvious that there would be such crowding at one end of the scale that the speedometer would be difficult to read. Further, if one wished to process such a signal by digital techniques wherein the voltage is converted to a series of pulses which may be accumulated for use as a log or sampled during precise periods for an indication of speed, such an irregular signal is almost worthless.

The present invention provides a simple low cost solution of the problem by dividing the overall voltage output into a series of straight line segments that approximate the desired function. In a practical embodiment of the invention, the signal was divided into five segments to provide an output signal which had an accuracy of plus or minus 0.5 percent in the range from 20 to 100 percent of maximum speed and an accuracy of plus or minus 2.5 percent maximum speed from zero to 20 percent of the range. Since most boat users are primarily interested in the higher end of the range, this is an extremely satisfactory solution to the problem.

Although in the description of the invention, the signal is divided into five segments, it will be obvious that one could use the teaching of the invention to divide the signal into a larger or smaller number of segments depending upon the accuracy desired.

DESCRIPTION OF THE PREFERRED EMBODIMENTS

Figure 1:
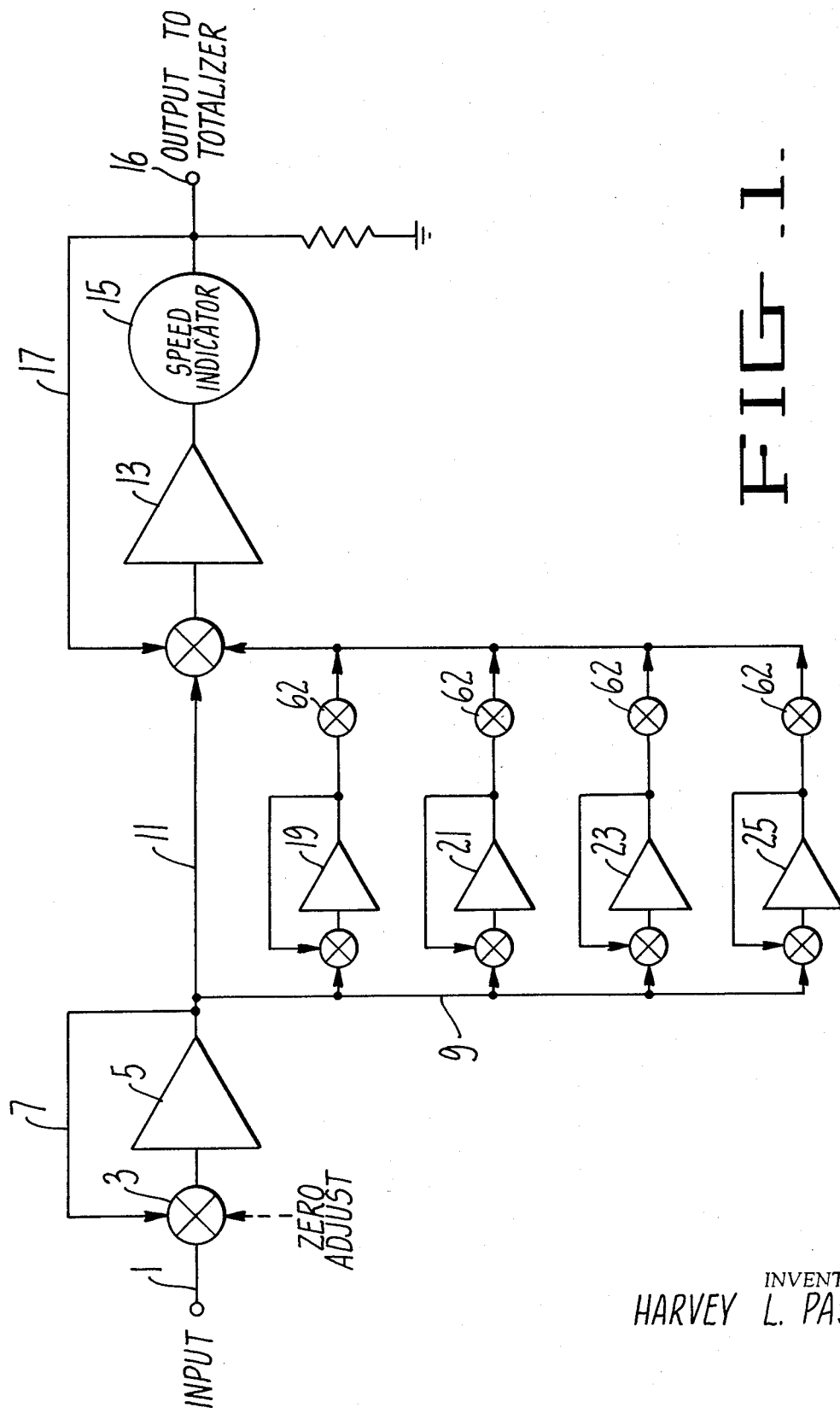
FIG. 1 is a block diagram illustrating the general principle of the invention.

Referring now to the block diagram of FIG. 1, the signal from the input which is a probe actuated transducer is fed from an input line 1 to a voltage divider network 3 and into an operational amplifier 5. A portion of the output signal is fed back through line 7 to the voltage divider 3. The function of this input circuit is to provide a means for adjusting out the residual zero unbalance from the transducer, standardizing the scale factor of the transducer signal to the desired full range and smoothing the signal with an effective time constant of several seconds. The signal is fed to the inverting input of the operational amplifier 5 and the voltage appearing at the output of the amplifier on line 9 varies from a voltage of 5 volts at zero speed to 2 volts at maximum speed.

The central section in the block diagram shows the non-linear function generating amplifiers. The first segment of the 1.9th root curve is taken directly from the amplifier 5 through line 11 and fed through amplifier 13 to a speed indicator 15 which is suitably an 0–200 microammeter. A portion of the signal is fed back through line 17 for stability purposes.

The signal is also fed through line 9 to the operational amplifiers 19, 21, 23, and 25. These amplifiers are biased in such a manner that they do not start to operate until a desired point is reached and then function to produce negative voltages which are summed in resistors 62 and subtracted from the first segment input to amplifier 13 to yield the desired straight line approximation. Thus, the second segment amplifier contributes no output signal until its input signal exceeds 3,2 percent of full range input. The output from this stage then subtracts from the first segment input to provide the desired slope to segment 2.

In 21, 23, and 25, the third, fourth, and fifth segment amplifiers start functioning at 14.4, 35.4 and 67.0 percent of full scale input respectively. Thus, each of the amplifiers starts functioning at a desired point on the curve and produces a successively greater subtractive voltage to give the desired straight line output voltage from the expotential input voltage. As has been previously stated, this voltage is summed and operates the operational amplifier 13 and the speed indicator 15. Further, an output can be taken from 16 to operate a totalizer or can be digitally processed to yield indications of distance and speed.

Figure 2:
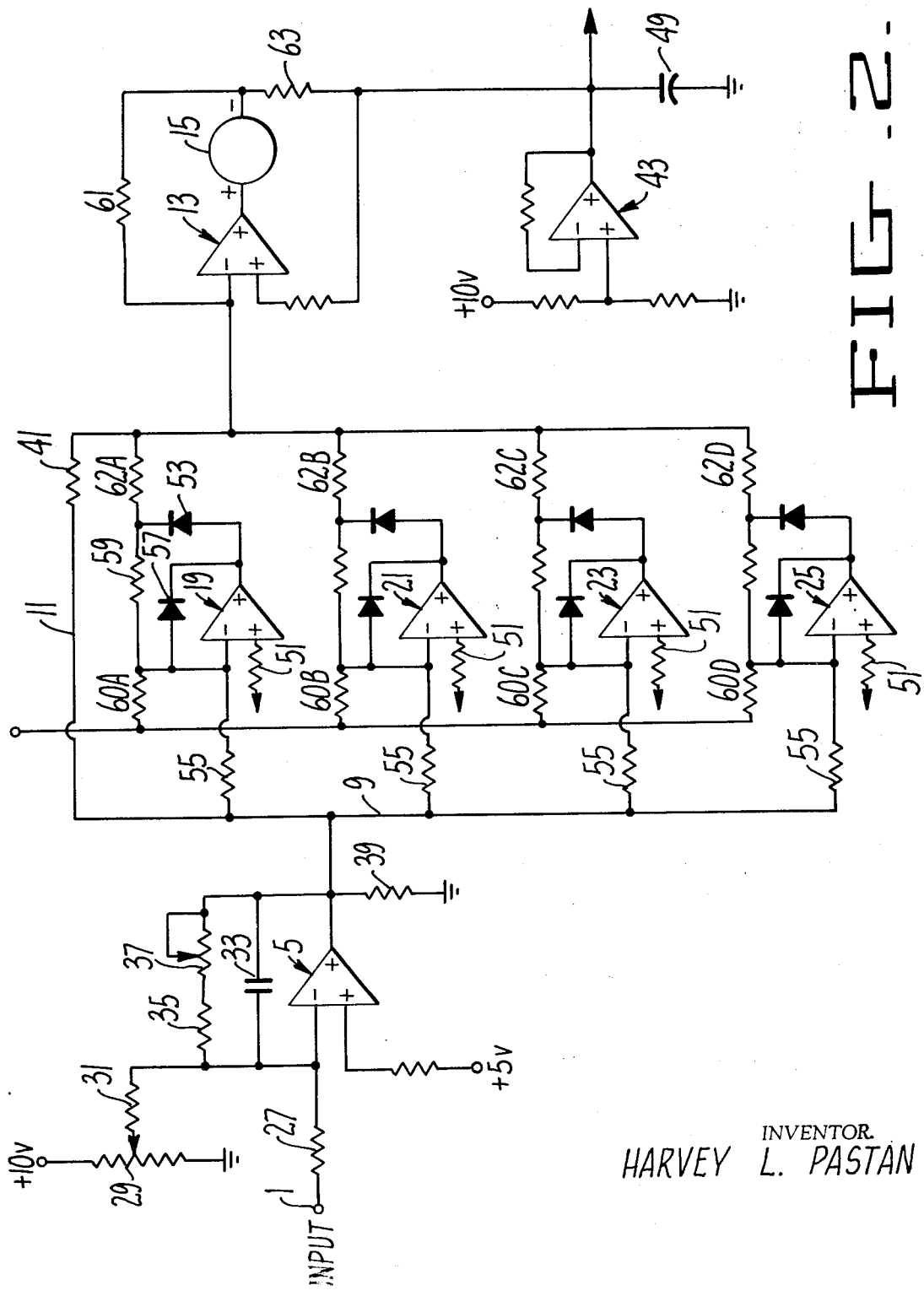
FIG. 2 is a practical schematic diagram of a working embodiment of the invention.

Referring now to the detailed schematic diagram of FIG. 2, the input signal 1 is passed to the inverting input of amplifiers 5 through 100K resistor 27 and a positive voltage is also fed to this input amplifier through a 100K potentiometer 29 and 4.7M resistor 31. (K equals 1,000 and M equals 1,000,000). Potentiometer 29 serves as a zero adjustment for the circuit. A feedback circuit for the amplifier includes the capacitor 33 of 20 mfd., a fixed resistor 35 of 50K and a variable resistor 37 of 100K. The 100K potentiometer serves as a sensitivity adjustment. The amplifier uses high value resistors for input and output scaling in order to achieve a reasonable amount of smoothing with the relatively small integrating capacitor 33. With the values shown, the time constant is about 2 seconds. If desired, the resistor 31 can be decreased in value and this will increase the zero adjust range. Potentiometer 37 preferably has a very low temperature coefficient. The output of the amplifier is grounded through a 1.5K resistor 39 and this relatively low value of resistance helps the negative going output signal of the amplifier drive as far negative as possible since a full 3 volt swing into a 2,000 ohm load is needed at this point.

As was previously described, the first segment signal is now passed through line 11 and a 10K resistor 41 to the input of amplifier 13 where it is used to actuate the indicator 15. The other segments of the signal are processed in amplifiers 19, 21, 23, and 25. All of these amplifiers are provided with a stable signal ground voltage level at one-half the excitation voltage. This is provided by amplifier 43 which is used as a non-inverting voltage follower. A 25 mfd capacitor 49 across the output is used to provide a low impedance path at high frequencies and to prevent current instability through the common amplifier impedance. The output, about + 5V, is indicated by an arrow and is connected to the non-inverting inputs of each of the amplifiers 19, 21, 23, and 25 through four 4.7K resistors 51. These resistors are scaled to approximately match the impedance to signal ground in the inverting input circuit in order to minimize the effective drift caused by common mode input current variations with temperature.

Only the operation of the second segment amplifier 19 will be described in detail since the amplifiers all operate in the same manner except for their turn on points. The current flowing into resistor 60A between +10V and the inverting input causes the amplifier output to swing negative, below 5 volts. A diode 57 between the inverting input and output is now forward biased and the amplifier output need only swing a very small voltage below signal ground to balance the input current through the resistor 60A between +10V and the amplifier inverting input. The input from line 9 is passed to the inverting input of the amplifier through a 10K resistor 55 and when a signal voltage through this resistor decreases to a point where it draws off all the input current formerly carried by the feedback diode 53, the amplifier output starts to swing positive, cutting off conduction through the now reversed biased diode 53 in the feedback loop. Thus, the point at which the amplifier turns on is determined by the ratio of resistors 55 and 60. Feedback is now achieved through the negative output limiting diode 53 and the feedback resistor 59 which has a value of 10K. Under these conditions the amplifier has unity gain.

The input signal voltage at which each amplifier 19, 21, 23, and 25 "turns-on" is, therefore, simply as follows:

$$E_{ON} = -5 \text{ volts} \times \frac{10K}{\text{(resistance from} + 10V \text{ to amp. input)}}$$

Thus, the function of each amplifier in turn is that the respective amplifier turns on at the proper time to contribute its subtractive voltage for the desired segment. The gain of each amplifier is zero until it turns on and then it is −1. The amplifier input resistances are designated 60A, 60B, 60C, and 60D respectively and the amplifiers turn on at various percentages of the full scale output from amplifier 5. The following values were used:

| Segment | Amplifier | Input R | % full scale |
|---|---|---|---|
| 1 | none | | 0 |
| 2 | 19 | 521K | 3.2 |
| 3 | 21 | 115.7K | 14.4 |
| 4 | 23 | 47.K | 35.4 |
| 5 | 25 | 24.9K | 67 |

The amplifier output or summing resistors are designated 62A, 62B, 62C, and 62D, respectively and have the following values:

| Segment | Output R |
|---|---|
| 2 | 14.5K |
| 3 | 80.4K |
| 4 | 182.5K |
| 5 | 355K |

The current amplifier 13 takes the sum of the five input signals to generate the proper transfer function. The 37K feedback resistor 61 in parallel with the 13.7K current sensing resistor 63 form an equivalent load of 10K ohms. Two hundred microamperes through this resistance produces the output scale factor of 2 volts full scale. This circuit can drive meter movements with resistances up to 5,000 ohms. System accuracy and calibration are not affected by meter resistance changes with temperature.

All of the amplifiers were Fairchild $\mu$A741C although naturally other operational amplifiers could be substituted. The diodes are preferably all of the hot carrier type because of their low forward breakdown voltage. Hewlett Packard diodes 5082-2800 were found suitable for this purpose.

In the foregoing description, it has been assumed that the circuit would be used in conjunction with a transducer having an output which varies of the factor of 1.9th power as to speed. Obviously by shifting the values of the components, one could use the speedometer with transducers having other output characteristics. Also, it has been assumed that the output voltage would be divided into five segments. Obviously the number five is a trade-off between complexity and accuracy and one might divide the circuit into fewer segments if a lower accuracy were acceptable or likewise one might use a greater number of segments to obtain greater accuracy.

We claim:

1. A boat speedometer comprising in combination:
   a. a probe actuated transducer having a non-linear voltage output which varies from a linear voltage by an exponent having a value greater than 1,
   b. providing a plurality of amplifiers, each having a negative gain,
   c. means for biasing said amplifiers so that each amplifier turns on successively as the voltage applied to the input of the amplifier increases,
   d. means for applying said non-linear voltage output from said transducer to the input of each of said amplifiers,
   e. means for summing the outputs of all of said amplifiers and subtracting the sum from a voltage proportional to said non-linear voltage to obtain a linear voltage, and
   f. an output indicator of said linear voltage.

2. The speedometer of claim 1 wherein the non-linear voltage output of the probe actuated transducer varies as the 1.9th power of the speed and wherein four negative gain amplifiers are provided.

* * * * *